March 19, 1935.  F. W. PECK ET AL  1,994,484
PROCESS OF PRODUCING N-DIHYDRO-1,2,2',1'-ANTHRAQUINONE AZINE
Filed March 27, 1934
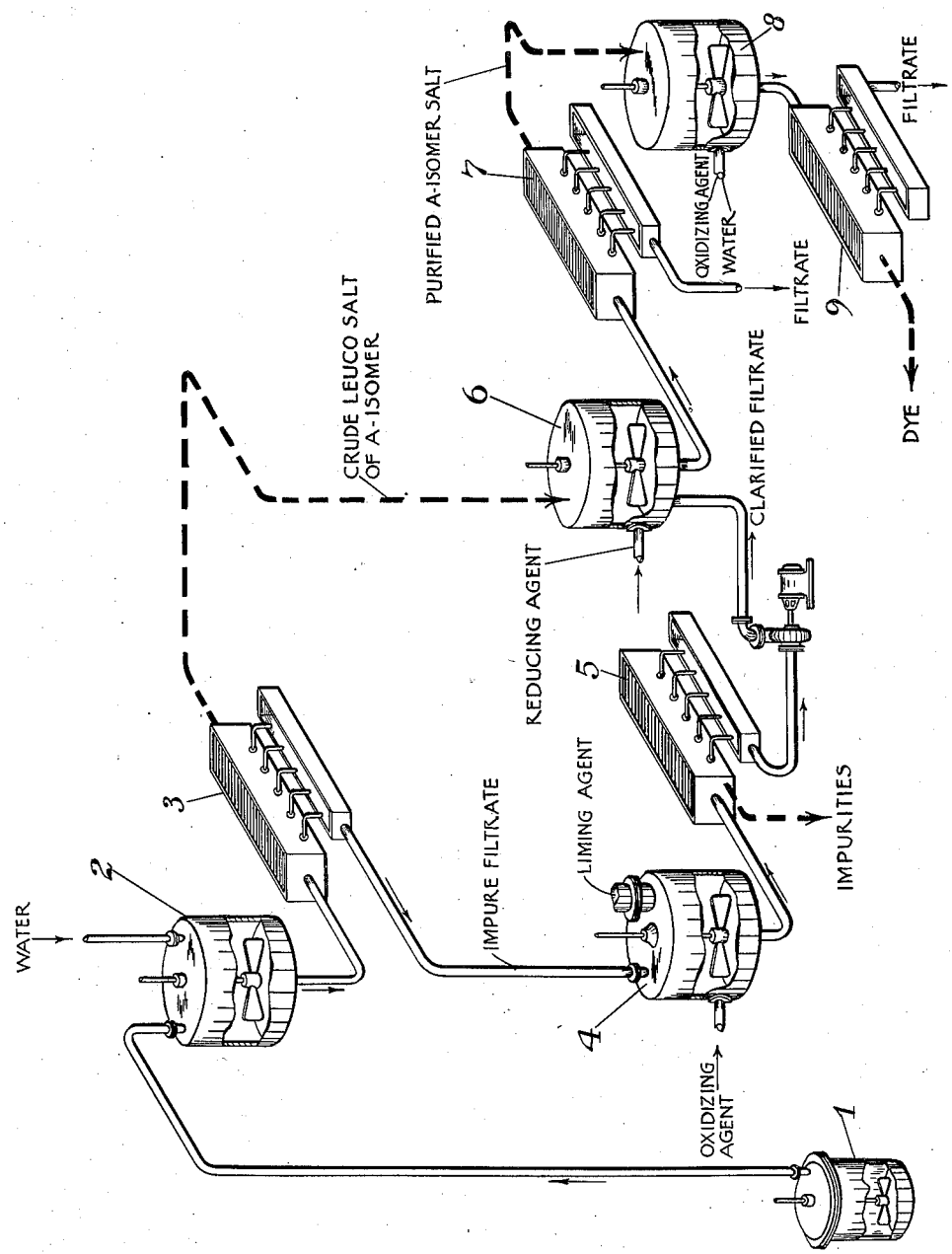
INVENTORS
Ferdinand W. Peck
Francis Knowles
BY
R. L. Johnston
ATTORNEY.

Patented Mar. 19, 1935

1,994,484

UNITED STATES PATENT OFFICE 1,994,484

PROCESS OF PRODUCING N-DIHYDRO-1,2,2',1'-ANTHRAQUINONE AZINE

Ferdinand W. Peck, Pennsgrove, N. J., and Francis Knowles, Wilmington, Del., assignors to E. I. du Pont de Nemours & Company, Wilmington, Del., a corporation of Delaware Application March 27, 1934, Serial No. 717,636

16 Claims. (Cl. 260—31)

This invention relates to N-dihydro-1,2,2',1'-anthraquinone azine, and a process for the production thereof.

In 1901 Bohn disclosed in U. S. Patent No. 682,523 that by melting beta-amino-anthraquinone with caustic potash at a temperature of 180° C. to 300° C., a substance was formed which, on oxidation by blowing in air, yielded an insoluble blue vat dye. Bohn later discovered that this original dye was a mixture of two rather closely related compounds, now usually designated as the A- and B-isomers. The A-isomer, N-dihydro-1,2,2',1'-anthraquinone azine, or indanthrone, is very valuable commercially. The B-isomer has practically no commercial value.

The preparation of the A-isomer has been the subject of much investigation and many refinements of the original Bohn process have been proposed, particularly with regard to the use of various oxidizing and fluxing agents in the caustic alkali fusion. On account of the fact that the fusion melt contains not only the A- and B-isomers but, also, alizarines and other impurities, one of the more difficult problems has been the separation of the A-isomer in suitable purity and yields.

Two methods of separation may be mentioned. The first of these is described by Bohn in U. S. Patent No. 724,789. This consists in drowning the fusion melt in water, blowing air through the solution, separating the insoluble dye material which is substantially a mixture of the A- and B-isomers, and then vatting with sodium hydrosulfite in fresh caustic alkali solution. The leuco salt of the A-isomer, being less soluble than that of the B-isomer in the presence of the sodium hydrosulfite, may be separated and the separated salt oxidized to the dye. It will be noted that this difference in solubility of the leuco salts of the A- and B-isomers in the presence of sodium hydrosulfite is distinctly a teaching of Bohn.

A variation has been proposed by Rogers, U. S. Patent No. 1,679,230. This differs from Bohn's method in that the step of oxidizing the drowned fusion melt to precipitate the mixture of A- and B-dyes is omitted. That is to say, Rogers dissolves the fusion melt in water, adds sodium hydrosulfite and crystallizes the less soluble leuco salt of the A-isomer. In other words, Rogers uses as a vatting medium the caustic liquor produced when the fusion is drowned. After separating the A-isomer leuco salt from the by-products, it is then oxidized to the dye in any suitable manner.

By both of these methods it will be noted that the final separation of the leuco salt of the A-isomer from the caustic liquor is made in the presence of relatively large amounts of impurities. In the Bohn process, the leuco salt of the B-isomer is the principal impurity. In the Rogers process, not only the B-isomer leuco salt but alizarines and other impurities from the caustic fusion are present. The presence of such impurities tends to increase the difficulty of separation and decrease the purity of the product.

It is an object of the present invention to provide a new and improved process for the production of N-dihydro-1,2,2',1'-anthraquinone azine in a high state of purity. Another object is to provide a new and improved method of producing N-dihydro-1,2,2',1'-anthraquinone azine in high yields. Other objects will appear hereinafter.

These objects are accomplished according to the present invention by the combination of steps involving fusing beta-amino-anthraquinone with molten caustic alkali, mixing the fusion mass with water, separating the crude A-isomer leuco salt, clarifying the residual caustic alkali solution by removal of the B-isomer and alizarines, then mixing the crude A-isomer leuco salt previously separated with the clarified caustic alkali solution, adding sodium hydrosulfite, crystallizing the leuco salt of the A-isomer, and isolating it, e. g., by filtration. Upon oxidation of the leuco salt thus produced, N-dihydro-1,2,2',1'-anthraquinone azine is obtained.

By effecting a preliminary separation of the A-isomer leuco salt and then subjecting it to treatment with sodium hydrosulfite in the substantial absence of contaminating impurities such as the B-isomer leuco salt and alizarines, a product of excellent purity is obtained.

The accompanying flow-sheet illustrates in more detail how the invention may be practised. A specific method of operation described in connection with the flow-sheet, but without stating proportions of materials, is as follows:

The fusion of beta-amino-anthraquinone is carried out in vessel 1 with a mixture of sodium hydroxide and potassium hydroxide in the presence of an oxidizing agent such as, for example, potassium chlorate, and also in the presence of so-called fluxing agents such as, for example, sodium acetate and sodium phenolate, the use of which gives an increased yield of A-isomer. This fusion melt is drowned in warm water in vessel 2 whereupon the crude leuco sodium salt of the A-isomer crystallizes in coarse needles. This A-isomer leuco salt, with a small amount of B-isomer leuco salt and other impurities, is isolated from the caustic alkali mother liquor by filtration in filter press 3. The filtrate, which contains most of the B-isomer as well as various alizarine bodies which are formed in the fusion, is run into vessel 4 and aerated to precipitate the B-isomer and then treated with calcium hydroxide to precipitate the alizarines. This caustic liquor is then clarified by filtration in filter press 5 and the sludge discarded.

The crude A-isomer leuco salt as obtained from the initial filtration is suspended in the clarified caustic liquor in vessel 6 and heated, preferably to 58° C. The addition of a small amount of sodium hydrosulfite reduces the impurities to soluble products and leaves the crystalline leuco A-isomer suspended in this relatively pure medium. These crystals are filtered in filter press 7, washed, and finally oxidized to the dihydro body in vessel 8 by any suitable method, for example, by air in boiling water. The finished N-dihydro-1,2,2',1'-anthraquinone azine is isolated in a filter press 9.

The invention will be further understood, but is not limited, by the following examples, in which the parts are by weight.

Example I

Heat a mixture of 380 parts of potassium hydroxide and 160 parts of sodium hydroxide to 260° C. to 275° C. in an agitated iron fusion pot. When completely fused and mixed, cool and add 40 parts of anhydrous sodium acetate, 24 parts of potassium chlorate and allow it to mix in completely. Then add a mixture of 120 parts of beta-amino-anthraquinone and 50 parts of anhydrous sodium phenolate at about 200° C.

When the fusion is complete, drown slowly in 7800 parts of water. Wash out the fusion pot, adding the washings to the drowned charge and finally adjusting the volume to 12,000 parts. Cool to 40° C. with slow agitation and filter, saving the filtrate and crude filter cake comprising substantially the leuco salt of the A-isomer.

Aerate the filtrate until there is no more precipitation of B-isomer. Add 150 parts of calcium hydroxide and stir for one hour, testing to see whether the addition of more lime will precipitate additional alizarines. After the addition of sufficient lime, filter the caustic liquor, discarding the insoluble sludge.

Mix the crude filter cake obtained as above described into the clarified caustic liquor and heat to 58° C. Add 60 parts of sodium hydrosulfite and stir for fifteen minutes. Examine a sample to determine the size of the crystals and their freedom from impurities. Cool to 38° C. and filter, washing the sodium leuco A-isomer crystals with 3000 to 4000 parts of water containing 2% of caustic soda and 0.1% of sodium hydrosulfite. Continue the washing until the filtrate is clear. When completely washed, add the leuco cake to 5000 parts of boiling water and aerate until there is no change in the form of the crystals. Filter and wash alkali-free; any trace of blue color from this filtration or washing indicates incomplete oxidation.

Excellent yields of N-dihydro-1,2,2',1'-anthraquinone azine are obtained. The product contains practically no B-isomer.

Example II

Heat a mixture of 356 parts of potassium hydroxide and 184 parts of sodium hydroxide to 275° C. in an agitated iron fusion vessel. When completely fused and mixed, cool and add 40 parts of anhydrous sodium acetate, followed by 24 parts of potassium chlorate and allow this to mix completely. Then add 120 parts of beta-amino-anthraquinone and 50 parts of anhydrous sodium phenolate at about 200° C.

When the fusion is complete, drown the fusion mass slowly in 7800 parts of water, which is at 40° C. at the start. Wash out the fusion pot, adding the washings to the drowned charge, finally adjusting the volume to about 9800 parts. Cool the charge to 35° C., stirring slowly, and at this temperature filter the crude leuco A-isomer crystals, saving the filtrate for purification.

Suspend the crude leuco A-isomer crystals in the caustic liquid, which has been purified as in Example I, to remove B-isomer and alizarines. When the filter cake is completely broken up, heat to 58° C. and add 60 parts of sodium hydrosulfite. After stirring fifteen minutes, examine a sample of the charge to determine the size and purity of the leuco A-isomer crystals. Cool to 38° C. and filter, washing the crystals with 3000 to 4000 parts of a 2% solution of caustic soda containing 0.1% of sodium hydrosulfite. When completely washed, oxidize the crystals to N-dihydro-1,2,2',1'-anthraquinone azine and isolate the product as in Example I.

The dye is of excellent purity.

Example III

Heat 540 parts of potassium hydroxide to 275° C. in an agitated iron fusion pot. When melted, cool and add 40 parts of anhydrous sodium acetate followed by 24 parts of potassium chlorate, and allow it to mix completely. At 200° C. to 205° C. add a mixture of 120 parts of beta-amino-anthraquinone and 50 parts of anhydrous sodium phenolate.

When the fusion is complete, drown the fusion mass in 7800 parts of water at 40° C., washing out the pot with additional water to make 9800 parts.

Cool the charge to 30° C. and filter off the impure leuco A-isomer crystals, saving the filtrate for purification. Suspend these crystals in the caustic liquor which has been purified as in Example I, and heat to 60° C. These crystals are normally completely dissolved at this temperature, with the possible exception of a small amount oxidized in the transferring of this material. At 60° C. add 60 parts of sodium hydrosulfite. This does not normally precipitate any leuco crystals. Cool the charge slowly to 25° C.; at 42° C. to 45° C. leuco N-dihydro-1,2,2',1'-anthraquinone azine-potassium salt crystals separate. Filter the crystals at 25° C. and wash with a cold 2% solution of caustic soda containing 0.1% of sodium hydrosulfite. When completely washed, oxidize the crystals to the dye by boiling in water. Isolate the color by filtration and washing.

The purity of the color is excellent.

The method of effecting the caustic alkali fusion of the beta-amino-anthraquinone may vary widely in details well known to those skilled in the art. For example, other types of fluxing agents and oxidizing agents may be used.

Varying proportions of caustic alkali and different temperatures may be employed than those illustrated in the examples. It is preferable, however, for the purpose of the present invention that the fusion be conducted with a mixture of potassium and sodium hydroxides rather than potassium hydroxide alone. The separation of the A-isomer substantially as its leuco sodium salt leads to a better and more efficient recovery than the separation as the potassium salt.

Furthermore, in a fusion using potassium hydroxide alone, a temperature of 5° C. to 10° C. higher than that ordinarily used with mixtures of potassium hydroxide and sodium hydroxide is normally required. The low-melting eutectic of potassium hydroxide and sodium hydroxide is at about 50% potassium hydroxide, this being influenced by any carbonate present which forms a ternary mixture with a different minimum. In general, it is preferable to effect the fusion with a mixture of potassium and sodium hydroxides containing about 50% to about 80% potassium hydroxide and a minimum amount of carbonate.

The temperature and amount of water to which the caustic fusion mass is added upon completion of the reaction is rather important because these factors facilitate the separation of the A-isomer leuco salt. According to the Rogers patent, previously mentioned, the caustic alkali fusion was made with potassium hydroxide and much stress was laid upon the fact that the fusion melt was entirely dissolved in water. Moreover, according to the Rogers process, crystallization of the leuco salt of the A-isomer in relatively pure form was only possible by carrying it out in the presence of sodium hydrosulfite which serves to keep the B-isomer and other impurities in solution. Although Bohn pointed out in U. S. Patent No. 682,523 that the leuco compounds of the A- and B-dyes were present in the caustic fusion melt, it has not heretofore been considered possible to separate the A-isomer leuco salt directly from the drowned fusion melt in relatively pure form without an addition agent such as sodium hydrosulfite.

This primary isolation of the leuco salt of the A-isomer may be effected by drowning the caustic alkali fusion in warm water (that is, water at a temperature of about 40° C.). Crystals of the leuco salt of the A-isomer in the form of coarse needles are obtained in relatively pure form and may be easily filtered. Under the preferred conditions of drowning, the temperature normally rises so that at the end of the drowning it is about 58° C. to 60° C. Only a small amount of cooling is necessary when filtering the crude leuco sodium salt crystals; that is, the charge may be cooled from 60° C. to 45° C. without any appreciable loss of good color. Slow stirring and cooling seem to precipitate additional impurities. Especially desirable results are obtained when the caustic alkali fusion has been made with a mixture of potassium and sodium hydroxides, such as previously described, in which case the leuco crystals are those of the sodium salt. It has been found that very advantageous results are obtained when the concentration of the drowned fusion mass corresponds to about 5.5% of caustic alkali. Higher concentrations cause the separation of more impurities, make the filtration more difficult, and shorten the life of the filter cloth. Lower concentrations tend to dissolve more of the A-isomer leuco salt and render the separation more difficult.

The clarification of the caustic alkali liquor from which the crude leuco salt of the A-isomer has been separated is not limited to the exact procedure described in the examples. The air oxidation precipitates the B-isomer. Other methods of oxidation may be used. The oxidation may not be essential, however, since the leuco B-isomer may be precipitated as an insoluble salt along with the alizarines, for example, as the calcium salt by the addition of lime. While the alizarines are preferably precipitated by lime as the insoluble calcium salts, they may be precipitated as other insoluble salts (for example, the barium or magnesium salts). The treatment with the reagent adapted to precipitate the insoluble salts may be carried out with or without heating, depending upon the specific reagent. The amount of the precipitating reagent should be sufficient to precipitate all of the matter which will form an insoluble salt.

While the examples describe the oxidation of the A-isomer leuco salt to the dye by boiling in water, it will be recognized that any suitable method may be employed. By varying the oxidizing agent and the oxidizing conditions, the purity of the color is only slightly affected, but there is a marked difference in its physical state.

The advantages of the present invention will be apparent. Whereas the prior art process of Bohn involves the final separation of the A-isomer leuco salt in the presence of substantially all of the B-isomer leuco salt and the Rogers process is characterized by the fact that the final separation of the A-isomer leuco salt is made not only in the presence of the B-isomer leuco salt but, also, the alizarines and other impurities, in the present process substantially all of the B-isomer leuco salt and all of the alizarines are removed from the caustic alkali solution prior to the final purification of the A-isomer. The purified caustic from a previous drowning or fresh caustic may be used for the final purification of the leuco A-isomer where conditions or convenience, for example, cost and equipment, permit. The resultant product is of a higher quality than may be obtained by either of the above-noted prior art processes. Furthermore, the amount of sodium hydrosulfite required in the present process is less than in the prior art processes.

As many apparently widely different embodiments of this invention may be made without departing from the spirit and scope thereof, it is to be understood that we do not limit ourselves to the specific embodiments thereof except as defined in the following claims.

We claim:

1. In a process of producing N-dihydro-1,2,2',1'-anthraquinone azine involving subjecting beta-amino-anthraquinone to the action of molten caustic alkali whereby a fused reaction mass is obtained, the steps which comprise mixing said fused mass with water, separating the crude leuco salt of the A-isomer, introducing the resultant crude leuco salt of the A-isomer into a relatively pure caustic alkali solution with the addition of sodium hydrosulfite, and crystallizing the purified leuco salt of the A-isomer.

2. In a process of producing N-dihydro-1,2,2',1'-anthraquinone azine, the steps which comprise subjecting beta-amino-anthraquinone to the action of molten caustic alkali wherein a fused reaction mass is obtained, mixing said fused mass with water, separating the crude leuco salt of the A-isomer, clarifying the residual caustic alkali solution by removal of the B-isomer and alizarines, mixing together the clarified solution and the crude leuco salt of the A-isomer with the addition of sodium hydrosulfite, and crystallizing the purified leuco salt of the A-isomer.

3. In a process of producing N-dihydro-1,2,2',1'-anthraquinone azine involving subjecting beta-amino-anthraquinone to the action of molten caustic alkali whereby a fused reaction mass is obtained, the steps which comprise mixing said fused mass with water, and separating A-isomer leuco salt crystals from the drowned fusion melt without the addition of a reducing agent.

4. The process of claim 3 in which the fused mass is mixed with water in such amount that the concentration does not exceed about 5.5%.

5. The process of claim 3 in which the initial temperature of the water to which the caustic alkali fusion mass is added is about 40° C.

6. In the process of producing N-dihydro-1,2,2',1'-anthraquinone azine, the steps which comprise subjecting beta-amino-anthraquinone to the action of molten caustic alkali wherein a fused reaction mass is obtained, adding said fusion mass to water initially having a temperature of about 40° C. and of such amount that the final concentration of the caustic alkali is about 5.5%, separating the crude leuco salt of the A-isomer, clarifying the residual caustic alkali solution by removal of the B-isomer and alizarines, mixing together the clarified solution and the crude leuco salt of the A-isomer with the addition of sodium hydrosulfite, and crystallizing the purified leuco salt of the A-isomer.

7. In a process of producing N-dihydro-1,2,2',1'-anthraquinone azine, the steps which comprise subjecting beta-amino-anthraquinone to the action of molten caustic alkali wherein a fused reaction mass is obtained, mixing said fused mass with water, separating the crude leuco salt of the A-isomer, subjecting the residual caustic alkali solution to an oxidation and liming treatment, separating the insoluble sludge, mixing together the resultant clarified caustic alkali solution and the crude leuco salt of the A-isomer with the addition of sodium hydrosulfite, and crystallizing the purified leuco salt of the A-isomer.

8. In a process of producing N-dihydro-1,2,2',1'-anthraquinone azine, the steps which comprise subjecting beta-amino-anthraquinone to the action of a mixture of potassium and sodium hydroxides in the presence of an alkali metal chlorate, an alkali metal acetate and an alkali metal phenolate wherein a fused reaction mass is obtained, mixing said fused mass with water initially having a temperature of about 40° C. and in such amount that the final caustic alkali concentration is not more than about 5.5%, separating the crude leuco salt of the A-isomer, clarifying the residual caustic alkali solution by removal of the B-isomer and alizarines, mixing together the clarified solution and the crude leuco salt of the A-isomer with the addition of sodium hydrosulfite, and crystallizing the purified leuco salt of the A-isomer.

9. In a process of producing N-dihydro-1,2,2',1'-anthraquinone azine, the steps which comprise subjecting beta-amino-anthraquinone to the action of a mixture of potassium and sodium hydroxides containing 50% to 80% potassium hydroxide in the presence of potassium chlorate, sodium acetate and sodium phenolate wherein a fused reaction mass is obtained, mixing said fused mass with water initially having a temperature of about 40° C. and in such amount that the final caustic alkali concentration is about 5.5%, separating the crude leuco salt of the A-isomer, clarifying the residual caustic alkali solution by removal of the B-isomer and alizarines, mixing together the clarified solution and the crude leuco salt of the A-isomer with the addition of sodium hydrosulfite, and crystallizing the purified leuco salt of the A-isomer.

10. The process of producing N-dihydro-1,2,2',1'-anthraquinone azine which comprises heating a mixture of 356 parts of potassium hydroxide and 184 parts of sodium hydroxide to about 275° C. in an agitated iron fusion vessel, cooling the fused mixture, mixing therewith 40 parts of anhydrous sodium acetate, followed by 24 parts of potassium chlorate, adjusting the temperature to about 200° C., and adding 120 parts of beta-amino-anthraquinone and 50 parts of anhydrous sodium phenolate at about 200° C. to about 205° C., after completion of the fusion drowning the fusion mass slowly in 7800 parts of water having an initial temperature of 40° C., adjusting the volume to an alkali concentration of approximately 5.5%, cooling the charge to 35° C., filtering the impure leuco A-isomer crystals, aerating the filtrate until no more precipitation of the B-isomer occurs, adding calcium hydroxide to the filtrate until no further precipitation of organic compounds occurs, separating the insoluble sludge from the filtrate, suspending the impure leuco A-isomer crystals in the clarified filtrate, heating the suspension to about 58° C., adding about 60 parts of sodium hydrosulfite, cooling to 38° C., filtering the leuco A-isomer crystals, washing them, and oxidizing them to N-dihydro-1,2,2',1'-anthraquinone azine.

11. In a process of producing N-dihydro-1,2,2',1'-anthraquinone azine involving subjecting beta-amino-anthraquinone to molten caustic alkali wherein a fused reaction mass is obtained, the step which comprises mixing said fused mass with previously heated water, whereby the formed A-isomer leuco salt may be separated as coarse crystals.

12. In a process of producing N-dihydro-1,2,2',1'-anthraquinone azine involving subjecting beta-amino-anthraquinone to the action of molten caustic alkali whereby a fused reaction mass is obtained, the step which comprises mixing said fused mass with previously heated water insufficient in amount to dissolve the fusion mass, whereby the A-isomer leuco salt is formed directly as coarse crystals.

13. In a process of producing N-dihydro-1,2,2',1'-anthraquinone azine involving subjecting beta-amino-anthraquinone to the action of molten caustic alkali whereby a fused reaction mass is obtained, the step which comprises mixing said fused mass with water at an initial temperature of about 40° C., the amount of water being insufficient to dissolve the fusion mass and the final caustic alkali concentration being not more than about 5.5%.

14. In a process of producing N-dihydro-1,2,2',1'-anthraquinone azine involving subjecting beta-amino-anthraquinone to the action of molten caustic alkali whereby a fused reaction mass is obtained, the step which comprises mixing said fused mass with previously heated water in such amount and at such a rate that the temperature rises to about 60° C.

15. The process of claim 11 in which the caustic alkali is a mixture of potassium and sodium hydroxides containing 50% to 80% potassium hydroxide.

16. The process of claim 12 in which the caustic alkali is a mixture of potassium and sodium hydroxides containing 50% to 80% potassium hydroxide.

FERDINAND W. PECK.
FRANCIS KNOWLES.